(12) United States Patent
Busse et al.

(10) Patent No.: US 11,231,525 B2
(45) Date of Patent: Jan. 25, 2022

(54) SEED LAYER FOR FABRICATION OF ANTIREFLECTIVE SURFACE STRUCTURES ON OPTICAL ELEMENTS

(71) Applicant: The Government of the United States of America, as represented by the Secretary of the Navy, Arlington, VA (US)

(72) Inventors: Lynda E. Busse, Alexandria, VA (US); Jesse A. Frantz, Washington, DC (US); Leslie Brandon Shaw, Woodbridge, VA (US); Jasbinder S. Sanghera, Ashburn, VA (US); Ishwar D. Aggarwal, Waxhaw, NC (US); Menelaos K. Poutous, Harrisburg, NC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/812,688

(22) Filed: Nov. 14, 2017

(65) Prior Publication Data

US 2018/0136370 A1    May 17, 2018

Related U.S. Application Data

(60) Provisional application No. 62/421,710, filed on Nov. 14, 2016, provisional application No. 62/431,178, (Continued)

(51) Int. Cl.
*C03C 25/68* (2006.01)
*G02B 1/118* (2015.01)
(Continued)

(52) U.S. Cl.
CPC .............. *G02B 1/118* (2013.01); *C03C 15/00* (2013.01); *C03C 25/68* (2013.01); *G02B 1/113* (2013.01);
(Continued)

(58) Field of Classification Search
CPC ......... C03C 15/00; C03C 25/68; G02B 1/113; G02B 1/118; G02B 5/0294; G02B 5/045;
(Continued)

(56) References Cited

U.S. PATENT DOCUMENTS

| 2002/0135869 A1* | 9/2002 | Banish ................ H01L 31/1832 359/350 |
| 2006/0132922 A1* | 6/2006 | Takao .................. G02B 5/0278 359/601 |

(Continued)

*Primary Examiner* — Balram T Parbadia
(74) *Attorney, Agent, or Firm* — US Naval Research Laboratory (57) ABSTRACT

The invention relates to methods for fabricating antireflective surface structures (ARSS) on an optical element using a seed layer of material deposited on the surface of the optical element. The seed layer is removed during or after the etching, and serves to control etching time as well as the transmission region of the optical element having ARSS. Optical elements having ARSS on at least one surface are also provided.

19 Claims, 4 Drawing Sheets

Related U.S. Application Data filed on Dec. 7, 2016, provisional application No. 62/519,595, filed on Jun. 14, 2017.

(51) Int. Cl.

| | | |
|---|---|---|
| *C03C 15/00* | (2006.01) | |
| *G02B 5/02* | (2006.01) | |
| *G02B 1/113* | (2015.01) | |
| *G02B 5/04* | (2006.01) | |
| *G02B 6/26* | (2006.01) | |
| *H01S 1/06* | (2006.01) | |
| *G02B 6/02* | (2006.01) | |
| *H05H 1/46* | (2006.01) | |

(52) U.S. Cl.
CPC ........... *G02B 5/0294* (2013.01); *G02B 5/045* (2013.01); *G02B 6/262* (2013.01); *H01S 1/06* (2013.01); *G02B 6/02052* (2013.01); *H05H 1/46* (2013.01)

(58) Field of Classification Search
CPC ....... G02B 6/262; G02B 6/02052; H01S 1/06; H05H 1/46
See application file for complete search history.

(56) References Cited

U.S. PATENT DOCUMENTS

| | | | |
|---|---|---|---|
| 2006/0213880 A1* | 9/2006 | Tanaka | C23C 16/483 219/121.69 |
| 2012/0127578 A1* | 5/2012 | Bright | G02B 5/207 359/585 |
| 2013/0129974 A1* | 5/2013 | Huang | C23C 18/1291 428/141 |
| 2015/0103396 A1* | 4/2015 | Zollars | G02B 1/118 359/350 |

\* cited by examiner

SEED LAYER FOR FABRICATION OF ANTIREFLECTIVE SURFACE STRUCTURES ON OPTICAL ELEMENTS

CROSS-REFERENCE TO RELATED APPLICATIONS

This application claims priority to U.S. Provisional Application No. 62/421,710, filed on Nov. 14, 2016, U.S. Provisional Application No. 62/431,178, filed on Dec. 7, 2016, and U.S. Provisional Application No. 62/519,595, filed on Jun. 14, 2017, the contents of which are incorporated herein by reference in their entirety.

TECHNICAL FIELD

This application relates generally to methods for fabricating antireflective surface structures (ARSS) on an optical element using a seed layer of material deposited on the surface of the optical element. The seed layer is removed during or after the etching, and serves to control etching time as well as the transmission region of the optical element having ARSS. Optical elements having ARSS on at least one surface are also provided.

BACKGROUND OF THE INVENTION

Each surface of an optical surface (such as a lens, a window, or the end face of an optical fiber) reflects some portion of the light incident upon it. These reflections, known as "Fresnel reflections" can be undesirable for a variety of reasons. These include reduced transmittance; feedback into laser systems; stray reflections; and, in the case of military applications, potential detection by enemy combatants. Fresnel reflections can be particularly problematic in systems with multiple optical elements, where the system suffers from the combined effects of reflection from many surfaces.

It was suggested by Lord Rayleigh in 1879 that a gradual transition in refractive index could serve to nearly eliminate the reflectance from a surface (Rayleigh, "On reflection of vibrations at the confines of two media between which the transition is gradual," *Proc Lond. Math Soc* sl-11, 51-56 (1879)). However, due to limitations in available materials, such a structure has been impossible to fabricate.

In bulk optics, Fresnel reflections are traditionally reduced using thin film dielectric stacks of materials with differing refractive indices. Thin film interference effects in these stacks lead to antireflective (AR) properties. Such coatings may be designed to reduce reflections for a limited spectral and angular range. To achieve performance over a broader spectral and/or angular range, many layers may be required. High-performance coatings often contain more than one hundred layers. Depositing such coatings is time consuming and costly. In addition to high cost, there are several additional problems associated with dielectric coatings. They exhibit laser induced damage thresholds (LIDTs) significantly lower than those of the bulk optics and are subject to environmental degradations and delamination under thermal cycling. Furthermore, dielectric AR coatings may suffer from strong polarization effects, with optical properties that depend on the polarization of the incident light.

One approach that has proven effective in reducing Fresnel reflections while avoiding the problems associated with traditional AR coatings is the direct patterning of ARSSs on the surface of optics (L. E. Busse, et al., "Anti-reflective surface structures for spinel ceramics and fused silica windows, lenses and optical fibers," *Opt. Mater. Express* 4, 2504-2515 (2014); L. E. Busse, et al., "Review of antireflective surface structures on laser optics and windows," *Appl. Opt.* 54, F303 (2015); and U.S. Pat. No. 8,187,481). Processing of these structures does not involve a permanent coating on the optic, but instead relies on nano-patterning of the surface of the optical material itself, where the refractive index and wavelengths dictate the particular microstructures needed. State-of-the-art processing has resulted in antireflective performance of ARSS comparable to that of the traditional AR coatings, while adding significant advantages such as higher laser damage thresholds (D. S. Hobbs, et al., "Laser damage resistant anti-reflection microstructures in Raytheon ceramic YAG, sapphire, ALON, and quartz," in *SPIE Defense, Security, and Sensing* (International Society for Optics and Photonics, 2011), p. 80160T-80160T), wide spectral bandwidths, large acceptance angles (J. J. Cowan, "Aztec surface-relief volume diffractive structure," *JOSA A* 7, 1529-1544 (1990)), polarization independence (G. Sapkota, et al., "Characterization of random anti-reflecting surface structures and their polarization response at off-normal angles of incidence," in *Proc. SPIE* v. 9927, *Nanoengineering: Fabrication, Properties, Optics, and Devices XIII*, E. M. Campo, et al., eds. (2016), 992712), and excellent performance on curved optics (C. Taylor, et al., "Optical performance of random anti-reflection structures on curved surfaces," in *Proc. SPIE* v. 9359, *Optical Components and Materials XII*, S. Jiang et al., eds. (2015), 935916).

ARSS can occur in nature, with an array of nanoscale structures in a regular, repeating pattern. Such a structure is often called "moth eye" because of its similarity to the naturally occurring ARSS structures found on moths' eyes. Theoretical models have been developed for ordered, microstructured surfaces on optics, whereby the surface features mimic the microscopic, pillar-like structures found on the surface of a moth's eye that reduce visible reflections and protect it from predatory owls (C. G. Bernhard et al., "A corneal nipple pattern in insect compound eyes," *Acta Physiol. Scand.* 56, 385-386 (1962)), yielding expected optical performance for appropriate sizes and shapes of the microstructures in optical surfaces to reduce reflections (W. H. Southwell, "Gradient-index antireflection coatings," *Opt. Lett.* 8, 584-586 (1983); W. H. Southwell, "Pyramid-array surface-relief structures producing antireflection index matching on optical surfaces," *J. Opt. Soc. Am.* A 8, p. 549-553 (1991); J. J. Cowan, "Aztec surface-relief volume diffractive structure," *J. Opt. Soc. Am.* A 7, p. 1529-1544 (1990); and P. Lalanne et al., "On the effective medium theory of subwavelength periodic structures," *J. Mod. Opt.* 43, 2063-2086 (1996)).

There has been a considerable amount of work to develop lithography techniques and dry or wet etching to create these ordered "moth eye" ARSS features in the surfaces of optics (T. Lohmueller, et al., "Improved Properties of Optical Surfaces by Following the Example of the 'Moth Eye'," *Biomimetics Learning From Nature*, ed. by A. Mukherjee, (Intech, 2010), Ch. 22; Y. Kanamori, et al., "Broadband antireflection gratings for glass substrates fabricated by fast atom beam etching," *Jpn. J. Appl. Phys.* 39, p. L 735-L 737 (2000); C. Aydin, et al., "Reduction of reflection losses in $ZnGeP_2$ using motheye antireflection surface relief structures," *Appl. Phys. Lett.* 80 242-2244 (2002); D. S. Hobbs, et al., "Design, fabrication, and measured performance of anti-reflecting surface textures in infrared transmitting materials," *Proc. SPIE* 5786, 40-57 (2005)). Ordered moth eye is typically created using photolithography or is stamped with a patterned shim.

Alternately, ARSS may consist of random features which, on average, have the appropriate scale but are randomly distributed in position and/or feature dimensions. Random ARSS (rARSS) may be created via a dry etch process. Prior work has focused on creating random features in the surface of optics to reduce reflections in glass and silicon using reactive gas ion etching (M. J. Minot, "Single-layer, gradient refractive index antireflection films effective from 0.35 to 2.5 µm," *J. Opt. Soc. Am.*, 66:515-519 (1976); U.S. Pat. No. 4,229,233 (1980)), and in borosilicate glass by using chemical etching (L. M. Cook, et al., "Antireflective surfaces for high-energy laser optics formed by neutral solution processing," *Appl. Opt.* 21:1482-1485 (1982); L. M. Cook, et al., "Integral antireflective surface production on optical glass," *Comm. Amer. Ceram. Soc.* C152-155 (1982)). In some materials, local randomness in material composition alone leads to the desired random features. See, for example, U.S. Pat. No. 8,187,481.

Benefits of patterning optics with random ARSS microstructures are that fewer steps are required since lithography is not needed, scale-up to large sizes is possible (J. A. Frantz, et al., "Random anti-reflection structures on large optics for high energy laser applications," *Proc. SPIE* 9726, Solid State Lasers XXV: Technology and Devices (2016), 97261T), and curved optics can be easily patterned (C. Taylor, et al., "Optical performance of random anti-reflection structures on curved surfaces," in *Proc. SPIE* v. 9359, *Optical Components and Materials XII*, S. Jiang et al., eds. (2015), 935916).

However, existing methods do not provide adequate control of the size and spacing of features that is necessary in order to achieve the required optical bandwidth and transmission performance.

SUMMARY OF THE INVENTION

The invention described herein, including the various aspects and/or embodiments thereof, meets the unmet needs of the art, as well as others, by providing methods for fabricating antireflective surface structures (ARSS) on an optical element using a seed layer of material deposited on the surface of the optical element. The seed layer is removed during or after the etching, and serves to control etching time as well as the transmission region of the optical element having ARSS. Optical elements having ARSS on at least one surface are also provided.

In one aspect of the invention, a method for fabricating antireflective surface structures (ARSS) on the surface of an optic includes providing an optical element; applying a seed layer to at least one surface of the optical element; and dry etching at least one surface of the optical element, wherein ARSS are formed on the at least one surface of the optical element.

In another aspect of the invention, optical elements having ARSS on at least one surface are provided. The optical elements include ARSS on at least one surface, wherein individual ARSS features exhibit center-to-center width of adjacent features that varies according to $0.1 \leq d \leq 10$, where d equals a wavelength for which reduced reflection is desired, divided by twice the refractive index of the material used to form the optical element, and wherein individual ARSS features exhibit peak-to-peak height of adjacent features that varies according to $0.1 \leq H \leq 10$, where H equals one-half of the wavelength for which reduced reflection is desired.

Other features and advantages of the present invention will become apparent to those skilled in the art upon examination of the following or upon learning by practice of the invention.

DETAILED DESCRIPTION OF EMBODIMENTS OF THE INVENTION

The invention described herein, including the various aspects and/or embodiments thereof, meets the unmet needs of the art, as well as others, by providing methods for fabricating antireflective surface structures (ARSS) on an optical element using a seed layer of material deposited on the surface of the optical element. The seed layer is removed during or after the etching, and serves to control etching time as well as the transmission region of the optical element having ARSS. Optical elements having ARSS on at least one surface are also provided.

ARSS may be understood conceptually as providing a gradual transition in refractive index from one medium (medium A) to another (medium B). As light passes from A to B, the effective index in a given plane increases from that of A to that of B, as more of the area of a given plane is composed of medium B.

Optical Elements.

Optics or optical elements that are encompassed by the invention include, but are not limited to, windows, lenses, mirrors, end faces of optical fibers (where the fiber may be bare, or connectorized in a commercially-available or custom fiber connector), filters, beamsplitters, prisms, gratings, and diffusers. The optic may be an end cap that is cemented or fusion spliced to the end of an optical fiber. The optic may be a lens at the end of an optical fiber, and may be a standard refractive or graded index (GRIN) lens that is cemented or fusion spliced to the end of the fiber. Alternately the optic may be a lens that is formed directly on the end of the fiber by machining or by thermal processing. In addition to planar optical elements, such as windows, ARSS may be fabricated on non-planar optical elements in which one or both surfaces have a positive or negative curvature, or are cone-shaped, using the methods of the invention. The ARSS described here can be applied to an optical element having any surface configuration, including, for example, surfaces that are flat, curved, or cone-shaped.

The wavelengths being transmitted by the optical elements of the invention, which are used as a point of reference for the period of the pattern and the height of the ARSS structures, include the wavelengths that encompass the visible spectrum (i.e., wavelengths from about 390 nm to about 700 nm), as well as near ultraviolet (i.e., wavelengths from about 300 nm to about 400 nm). In some aspects of the invention, the wavelengths being transmitted make up one of the regions of infrared radiation: near infrared (i.e., wavelengths from about 0.75 μm to about 1.4 μm), short-wavelength infrared (i.e., wavelengths from about 1.4 μm to about 3 μm), mid-wavelength infrared (i.e., wavelengths from about 3 μm to about 8 μm), and long-wavelength infrared (i.e., wavelengths from about 8 μm to about 15 μm).

The wavelengths to be transmitted (and not reflected) are influenced by the materials selected to form the optical elements of the invention. The optical elements may be formed from any optical material that can be dry etched. Preferred materials for use in the methods and optical elements of the invention include, but are not limited to, silica having the composition $SiO_x$ (where x is from 1 to 3), silicate glasses (e.g., glasses primarily comprising $SiO_2$, including fused silica glass (which is 100% $SiO_2$), as well as glasses that combine $SiO_2$ with one or more additional compounds (such as borosilicate glass, soda-lime glass, alkali-free glass, lead glass, etc.)), magnesium aluminate spinel ($MgAl_2O_4$), $CaF_2$, Ge, Si, diamond, alumina, III-V semiconductors, and II-VI semiconductors. The III-V semiconductor materials comprise elements from Group IIIA of the Periodic Table (now IUPAC Group 13), which includes Al, Ga, and In, and elements from Group VA of the Periodic Table (now IUPAC Group 15), which includes N, P, As, and Sb. These III-V semiconductor materials include, but are not limited to, AlN, AlP, AlAs, AlSb, GaN, GaP, GaAs, GaSb, InN, InP, InAs, and InSb (and are preferably selected from GaAs, InP, GaP, and GaN). The II-VI semiconductor materials comprise elements from Group IIB of the Periodic Table (now IUPAC Group 12), which includes Zn and Cd, and chalcogens from Group VIB of the Periodic Table (now IUPAC Group 16), which includes S, Se, and Te. These II-VI semiconductor materials include, but are not limited to, ZnS, ZnSe, ZnTe, CdS, CdSe, and CdTe.

The optical elements, regardless of configuration and composition, may be provided with ARSS or rARSS over all or a portion of their surface, depending on the particular application for the optical element. This may be accomplished using laser irradiation, in which the laser spot size is controlled to cover the entire optic or a portion of the optic. This may also be accomplished by etching the surface of the optic, where either the entire surface is etched, or a portion of the surface is etched and other portions that are not to be etched are covered with a mask. The optical elements may optionally be designed to have ARSS in more than one region, with each region having ARSS configured to reduce reflection of a different wavelength or range of wavelengths.

Figure 1:
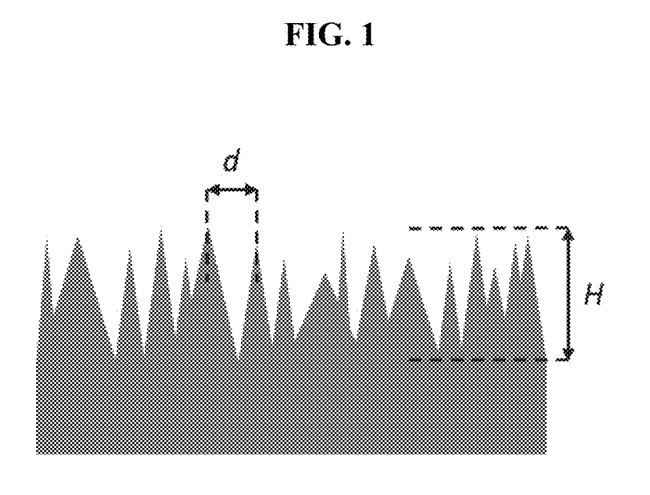
FIG. 1 is a schematic diagram of a cross section of an optical surface having random ARSS features across the surface.

With reference to FIG. 1, the spacing of the ARSS features depends on the refractive index of the optical element, with the center-to-center spacing of adjacent features, d, being approximately less than the wavelength for which reduced reflection is desired, divided by twice the refractive index of the material used to form the optical element. The value of d may not be identical for all sets of adjacent features, and can vary by a factor of from 0.1 to 10 times its nominal value. The height of the ARSS features is preferably selected to be approximately one-half the wavelength for which reduced reflection is desired, or approximately one-half of the smallest wavelength in the range of wavelengths for which reduced reflection is desired. H may be measured as the peak-to-peak height of the features. The value of H may not be identical for all sets of adjacent features, and can vary by a factor of from 0.1 to 10 times its nominal value.

In practice, the ARSS formed by the methods of the invention may include a random array of nanoscale structures in which the width between the ARSS is less than the wavelength of electromagnetic radiation for which reduced reflection is desired. In other embodiments, the ARSS of the invention may be formed in a pattern on an optic, where the period of the ARSS that form the pattern is less than the wavelength of electromagnetic radiation for which reduced reflection is desired. When a range of wavelengths are transmitted through the optic, the width between structures or period of the pattern, respectively, are preferably less than the smallest wavelength in the range of wavelengths for which reduced reflection is desired.

The ARSS may be created in a manner that forms a pattern. This is typically the case, for example, when an ARSS is created photolithographically or stamped. In some aspects of the invention, the pattern is designed to produce ARSS features that are separated by the preferred widths (d) and exhibit the preferred heights (H), as defined above.

Alternately, the ARSS may be random or non-patterned ARSS (rARSS). When the term rARSS is used, it may be used to refer to the fact that the individual ARSS features do not exhibit a repeated pattern. For example, "random" may be used to refer to features that arise from processes having a random component, e.g. ablation rates that vary randomly from point to point on a surface of an optical element. rARSS may be created, for example, via etching, or irradiation and re-deposition processes. It is to be appreciated that when the ARSS features are random or non-patterned, although many or most of the features are preferably separated by the preferred widths (d) and exhibit the preferred heights (H) set forth above, there will also be features that do not conform. Preferably, less than 25% of the rARSS features do not conform to the preferred widths (d) and heights (H), more preferably less than 15%, still more preferably less than 10%, most preferably less than 5%.

In some aspects of the invention, rARSS are preferred. For example, randomness of feature sizes may allow rARSS to provide AR performance over a broader spectral range than ordered ARSS. Random features are distinct from those that arise from patterning with an ordered process, e.g. patterning with a photomask with a repeated, ordered pattern or multi-beam holographic exposure.

The ARSS formed by the methods of the invention, whether provided in a random array or formed as a pattern, preferably provide the optical element with individual features or structures having a height that is less than the wavelength of the electromagnetic radiation for which reduced reflection is desired. The height of the features may be from about 25% to about 100% of the wavelength of the electromagnetic radiation for which reduced reflection is desired. In some particularly preferred embodiments, they have a height that is about one-half of the wavelength for which reduced reflection is desired. This beneficially permits simulation of a graded index variation between the medium surrounding the optical element (which is preferably air, but may vary depending on the application for which the optic is used) and the material forming the optical element.

The invention provides optical elements which exhibit reduced surface reflections at specified wavelengths as compared to untreated optical elements. The term "reduced reflection," as used in accordance with the invention, refers to a reduction in the amount of reflection of a given wavelength of electromagnetic radiation over the area of the optical element upon which the ARSS or rARSS are formed. The reduction may be a complete reduction, i.e., 100% reduction in reflection. The reduction may also be a partial reduction, i.e., 10%, 20%, 30%, 40%, 50%, 60%, 70%, 80%, 90%. Preferably, the reduction in reflection at a given wavelength or over a range of wavelengths is at least 50%. More preferably the surface reflections are reduced by at least 90%.

The anti-reflective (AR) property of the optical elements having random ARSS formed by the methods of the invention may be optically broadband, with low reflection over a spectral band. The resulting spectral band is greater than that for either antireflective dielectric films or ordered ARSS. In some preferred aspects, the low reflection is provided over a spectral band that is at least about 2 µm wide, preferably at least about 4 µm wide, more preferably at least about 6 µm wide, even more preferably at least about 8 µm wide. Reduced surface reflection also serves to increase the amount of light transmitted through an optic, and prevents back reflections that can be detrimental to the performance of optical systems.

Providing ARSS on the surface of the optics of the invention beneficially yields transmission over a wider field of view and shows less dependence on polarization of the incident light on that surface, as compared to traditional antireflective coatings. The invention may also beneficially provide a significantly higher laser-induced damage threshold (LIDT) for the optical elements of the invention, in comparison to untreated optics, as well as dielectric antireflective-coated optics.

Etching.

In accordance with the invention, etching processes may be used to produce ARSS structures on optical elements. Preferably, a dry etch process is used. The dry etch processes that may be used in accordance with the invention encompass any technique in which the material being etched is bombarded with ions (which may be provided as a plasma of reactive gases) that dislodge portions of the material from the surface. These may include high density plasma (HDP) etching, inductively coupled plasma reactive ion etching (ICP-RIE), and reactive ion etching (RIE). A preferred dry etch technique for use in carrying out the methods is RIE.

The inventive methods beneficially permit control of the size and spacing of ARSS features, and provide control over optical bandwidth and transmission performance of optical elements having ARSS thereon. This is achieved by forming the ARSS using a method that includes depositing a seed layer on the surface of the optic prior to etching. An optional thermal annealing step can be used to control and coalesce islands in the seed layer, in order to further control the size and spacing of the resultant ARSS features. The seed layer is either removed during the etching process, or can be removed from the surface of the optical element after etching, leaving an optic patterned with ARSS.

The methods of the invention may include the following steps:

Step 1. Deposit a seed layer of material onto the surface of the optic.

Step 2. Etch random features into the surface of the optic, which also removes most of the seed layer.

Step 3. Perform an optional chemical rinse to remove any remaining seed layer from the optical surface.

In Step 1, an optic is selected for random ARSS fabrication and is cleaned with procedures appropriate for that material. Then a thin seed layer of material is deposited onto the optic using standard methods for deposition, including methods such as sputtering or evaporation. The seed layer is preferably formed of gold, silver, aluminum, nickel, chromium, alloys incorporating these metals, and any combinations thereof. The seed layer may also be formed of silicon nitride, silicon oxide, calcium fluoride, and combinations thereof. The seed layer may also optionally include one or more dopants, including, but not limited to, chromium, titanium, iron, or aluminum. The seed layer may be applied by sputtering, by applying a solution containing the seed layer onto the surface of the optic and allowing it to dry, or by any other suitable technique.

A random seed layer may be achieved by depositing particulates, e.g., polymer microspheres in an aqueous suspension, on the surface of the optic, and then etching. The polymer microsphere seed layer may be used alone or in conjunction with an additional seed layer material. A random seed layer may also be achieved by depositing particulates on the surface of the optic, followed by deposition of a thin layer of metal (preferably about 10 nm to 25 nm thick) over the particulates, which partially mask the surface, followed by removal of the particulates prior to etching.

A random seed layer may also be formed by selecting the seed layer material to have a different coefficient of thermal expansion than the optical material. The seed layer is then deposited on the optic at elevated temperature and allowed to cool. The elevated temperature may be between 50° C. above room temperature and 800° C. above room temperature, and is preferably between 100° C. above room temperature and 300° C. above room temperature. During cooling to approximately room temperature, cracks form in the seed layer that provide microstructured features that create a template for etching.

Figure 2:
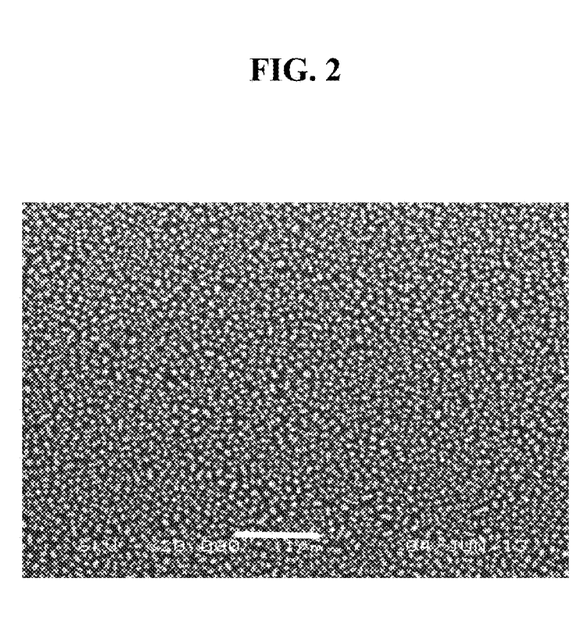
FIG. 2 is a photomicrograph of a gold seed layer deposited on the surface of fused silica, showing nanoclusters formed in a random pattern (scale bar=1 µm).

The seed layer may have a thickness of from about 10 nm to about 200 nm. Preferably, the seed layer has a thickness from about 10 nm to about 100 nm, and is more preferably from about 10 nm to about 25 nm in thickness. The seed layer may be deposited, or deposited and partially removed, such that less than a complete layer of the seed material is formed on the optic. FIG. 2 shows an example scanning electron microscopy photograph of the surface of silica glass with a gold seed layer deposited onto it, which exhibits a random pattern of nanoclusters that are of sub-micron dimensions.

In a further embodiment, after Step 1, the seed layer may optionally be further processed using annealing in order to coalesce islands in the seed layer material and further control the specific geometry of the features when the random ARSS is etched into the optical surface. Annealing may be accomplished, for example, in an oven, on a hot plate, or under exposure to other source of heat, at a temperature of from about 100° C. to about 600° C. in ambient conditions, under vacuum, in an inert atmosphere, or under flowing gases. Alternately, annealing may be accomplished via rapid thermal annealing (RTA) in which case the sample is rapidly heated, reaching the annealing temperature in a period of less than approximately 10 seconds.

In Step 2, the seed layer serves to create a random template through which the surface of the optical element is etched. Preferably, a dry etch process is used. The dry etch processes that may be used in accordance with the invention encompass any technique in which the material being etched is bombarded with ions (which may be provided as a plasma of reactive gases) that dislodge portions of the material from the exposed surface. These may include high density plasma (HDP) etching, inductively coupled plasma reactive ion etching (ICP-RIE), and reactive ion etching (RIE).

In one presently-preferred aspect, the optical surface is processed with a gas plasma in a reactive ion etching (RIE) chamber. Etching may be conducted using known gases and conditions that are appropriate for etching the optical material, as disclosed, for example, in U.S. Pat. No. 8,187,481 (the contents of which are incorporated herein by reference in their entirety).

Optimization of the etching process may be carried out in order to significantly reduce reflection loss, resulting in increased transmission through the optical element having ARSS, while reducing or eliminating back reflections and ghost reflections that can be detrimental, particularly to the performance of multi-element optical systems. When optical elements are etched in a RIE vacuum chamber, the pressure in the chamber is preferably maintained between 5 mTorr and 100 mTorr. The reactive gas may be selected from fluorocarbons, oxygen, chlorine, boron trichloride, hydrogen, sulfur hexafluoride, and combinations thereof, and is selected based on the material being etched. The reactive gas may be supplied along with a diluent gas, such as nitrogen, argon, helium, krypton, xenon and combinations thereof. The gas or gases may be delivered at a flow rate of from 2 sccm to 200 sccm. The RIE process may be carried out with or without acceleration using inductively coupled plasma (ICP). In some aspects, the methods of the invention are able to produce ARSS having a transmission below 300 nm in silica.

In amorphous materials, such as silica, the random seed layer works in conjunction with the micro- and nano-scale randomness in the glass to create the random surface microstructured features, as schematically shown in FIG. 1, where the center-to-center feature width d and peak-to-peak feature height H can vary across the surface. The seed layer serves to influence the spacing and height of the random structures on the surface, and thus yields a degree of freedom to select the desired optical properties, and is also used to reduce the reactive ion etching time. Without wishing to be bound by theory, it is believed that the seed layer influences the feature spacing because of the randomness that arises from the spacing of features in the seed layer, rather than relying on the intrinsic randomness in the material of the surface being patterned. The seed layer serves to influence feature height because areas where material from the seed layer are present are protected during etching, so these areas are etched more slowly than fully exposed areas. Thus, the seed layer may increase feature height.

In optional Step 3, following the etching process to create the ARSS on the surface of the optic, any remaining seed layer material can be completely removed using an acid or other chemical etchant appropriate for the seed layer that does not damage the surface of the optic.

The use of the methods of the invention, in which a seed layer is used to etch ARSS on the surface of an optical element, can also beneficially reduce the processing time needed to create the ARSS on the optical surface. Typical processing times for etching without a seed layer may vary based on the etching conditions selected and the material being etched, and may range from 10 to 120 minutes. In some aspects of the invention, the use of the seed layer can reduce processing times by approximately 10 to 50%, and preferably reduces processing times by at least about 20%.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1

Figure 3:
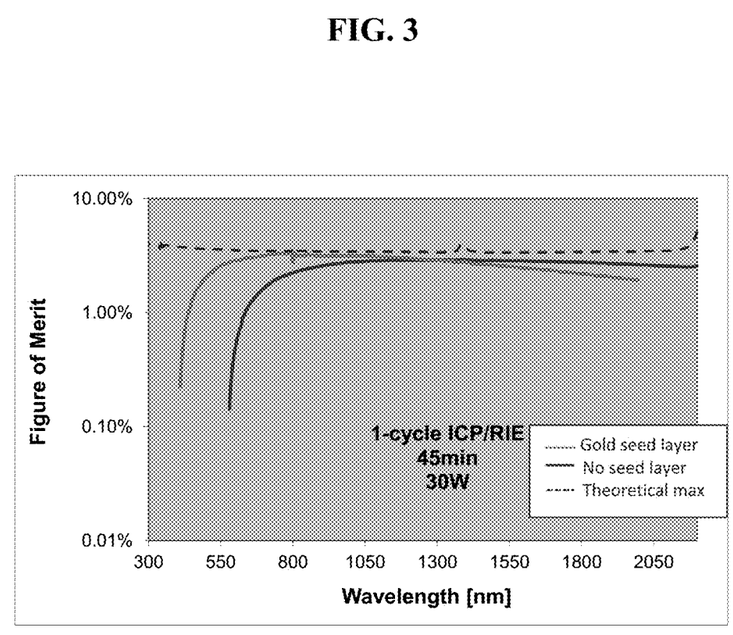
FIG. 3 is a graph showing the transmission measured for a silica glass window fabricated with ARSS on one side only, comparing a window formed without using a seed layer, and a window formed using a gold seed layer.

In FIG. 3, the transmission of a silica optic having ARSS formed using a gold sputtered seed layer is compared to that of a silica optic having ARSS formed without using a seed layer. The transmission of the samples was measured using a Cary spectrophotometer.

The silica optic having ARSS formed using the gold sputtered seed layer exhibited enhanced transmission at shorter wavelengths. The Figure of Merit in FIG. 3 is defined as $[(T_p/T_u)-1] \times 100$, where $T_p$=transmission of the surface processed with ARSS, and the $T_u$ is the unprocessed silica glass transmission, with the maximum theoretical transmission shown by the dashed line.

Example 2

ZnS windows were etched in a reactive ion etch (RIE) chamber in the presence of $H_2$ gas. The sample was first coated with a layer of gold having a thickness between 10 nm and 200 nm. This layer aided in the initial formation of surface features. The sample was placed into an RIE chamber, and a mixture of $H_2$ gas and He gases were flowed in the chamber. He gas was added to improve the stability of the process. The following process parameters were used: pressure=20 mTorr; total flow rate=10 sccm; ratio of gases=7 parts $H_2$/3 parts He; etch time=15 min.

Figure 4:
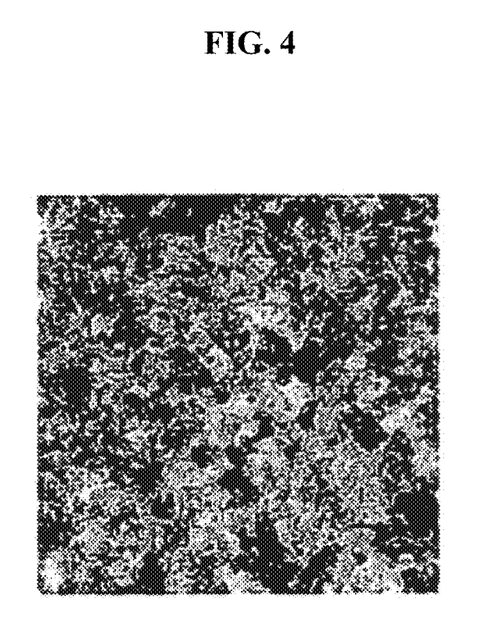
FIG. 4 is a photomicrograph of a ZnS surface roughened via RIE etch with $H_2$.

This etch procedure etched the ZnS surface to a depth of 3.159 μm, at an etch rate of approximately 200 nm/min, and produced a roughened surface. FIG. 4 shows an image of a ZnS surface roughened via this procedure.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method for fabricating antireflective surface structures, the method comprising:
   providing a dry-etchable optical substrate;
   applying a solution containing a seed layer to a surface of the optical substrate; and
   dry etching the seed layer and the optical substrate to remove portions of the seed layer and the optical substrate so as to form an optical element comprising a plurality of antireflective surface structures (ARSS), wherein a center-to-center spacing between adjacent antireflective surface structures is based on a refractive index of the optical substrate.

2. The method of claim 1, wherein the optical substrate is one of: silica having a composition $SiO_x$, where x is a number from 1 to 3, silicate glasses, glasses combining $SiO_2$ with one or more additional compounds, magnesium aluminate spinel ($MgAl_2O_4$), $CaF_2$, Ge, Si, diamond, alumina, III-V semiconductors, and II-VI semiconductors.

3. The method of claim 2, wherein the III-V semiconductor materials are selected from the group consisting of AlN, AlP, AlAs, AlSb, GaN, GaP, GaAs, GaSb, InN, InP, InAs, and InSb.

4. The method of claim 2, wherein the II-VI semiconductor materials are selected from the group consisting of ZnS, ZnSe, ZnTe, CdS, CdSe, and CdTe.

5. The method of claim 1, wherein the ARSS are formed as a pattern.

6. The method of claim 1, wherein the ARSS are formed as a random array.

7. The method of claim 1, wherein the dry etching is conducted using a technique selected from the group consisting of HDP etching, ICP-RIE, and RIE.

8. The method of claim 1, wherein the seed layer comprises: gold, aluminum, silver, chromium, nickel, alloys comprising one or more of gold, aluminum, silver, chromium, and nickel, or combinations thereof.

9. The method of claim 8, wherein the seed layer is doped with a dopant selected from the group consisting of chromium, titanium, iron, aluminum, and combinations thereof.

10. The method of claim 1, wherein the seed layer has a thickness of between 10 nm and 200 nm.

11. The method of claim 1, wherein the dry etching is carried out in a vacuum chamber.

12. The method of claim 11, wherein the vacuum chamber is maintained at a pressure between 5 mTorr and 100 mTorr.

13. The method of claim 1, wherein the dry etching is performed using a reactive gas selected from fluorocarbons, oxygen, chlorine, boron trichloride, hydrogen, sulfur hexafluoride, and combinations thereof.

14. The method of claim 13, wherein the reactive gas is supplied along with a diluent gas selected from the group consisting of nitrogen, argon, helium, krypton, xenon and combinations thereof.

15. The method of claim 1, wherein center-to-center spacings of adjacent antireflective surface structures are within a range of 0.1 to 10 times a wavelength of light for which reduced reflection is desired divided by twice a refractive index of the optical substrate.

16. The method of claim 1, wherein the seed layer comprises: silicon nitride, silicon oxide, calcium fluoride, and combinations thereof.

17. The method of claim 1, wherein the solution comprises a plurality of microspheres in an aqueous suspension.

18. A method for fabricating antireflective surface structures, the method comprising:
providing a dry-etchable optical substrate;
applying a seed layer to a surface of the optical substrate; and
dry etching the seed layer and the optical substrate to remove portions of the seed layer and the optical substrate so as to form an optical element comprising a plurality of antireflective surface structures (ARSS), wherein a center-to-center spacing between adjacent antireflective surface structures is based on a refractive index of the optical substrate,
wherein the seed layer is applied by depositing particulates onto the surface of the optical substrate, depositing a layer of metal over the particulates, and removing the particulates prior to the dry etching step.

19. A method for fabricating antireflective surface structures, the method comprising:
providing a dry-etchable optical substrate;
applying a seed layer to a surface of the optical substrate at a temperature between 50° C. and 800° C. above room temperature, wherein the seed layer and the optical substrate have different coefficients of thermal expansion;
cooling the seed layer and the optical substrate to room temperature such that a plurality of cracks form in the seed layer to form a template for etching;
dry etching the seed layer and the optical substrate to remove portions of the seed layer and the optical substrate so as to form an optical element comprising a plurality of antireflective surface structures (ARSS), wherein a center-to-center spacing between adjacent antireflective surface structures is based on a refractive index of the optical substrate.

\* \* \* \* \*